United States Patent
Monden

(10) Patent No.: US 8,707,735 B2
(45) Date of Patent: Apr. 29, 2014

(54) NARROW NECK GLASS CONTAINER WITH INTEGRAL EMBOSSMENTS AND METHOD OF MANUFACTURE

(75) Inventor: Stefan Monden, Auetal (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 271 days.

(21) Appl. No.: 12/638,523

(22) Filed: Dec. 15, 2009

(65) Prior Publication Data

US 2010/0089859 A1 Apr. 15, 2010

Related U.S. Application Data

(62) Division of application No. 11/904,437, filed on Sep. 27, 2007, now abandoned.

(51) Int. Cl.
*C03B 9/197* (2006.01)
*C03B 9/193* (2006.01)

(52) U.S. Cl.
CPC ............. *C03B 9/1932* (2013.01); *C03B 9/197* (2013.01)
USPC .................................. 65/79; 65/72

(58) Field of Classification Search
CPC .............................. C03B 9/1932; C03B 9/197
USPC .......................... 65/72, 79; 264/509, 523, 537
See application file for complete search history.

(56) References Cited

U.S. PATENT DOCUMENTS

| | | | |
|---|---|---|---|
| 2,054,553 A | 9/1936 | Ballard | |
| 2,984,047 A | 5/1961 | Mennitt et al. | |
| 3,468,648 A * | 9/1969 | Nowak | 65/76 |
| 3,792,988 A | 2/1974 | Nowak et al. | |
| 3,846,103 A | 11/1974 | Rowe | |
| 3,956,441 A * | 5/1976 | Uhlig | 264/530 |
| 4,008,063 A | 2/1977 | Kramer et al. | |
| 4,072,491 A | 2/1978 | Kramer et al. | |
| 4,105,428 A | 8/1978 | Adams | |
| 4,276,073 A * | 6/1981 | Northup | 65/77 |
| 4,336,050 A * | 6/1982 | Northup | 65/82 |
| 4,813,557 A * | 3/1989 | Herron et al. | 215/329 |
| 6,233,973 B1 | 5/2001 | Monchatre | |
| 2003/0168372 A1 | 9/2003 | Headen et al. | |
| 2005/0211655 A1 | 9/2005 | Bourreau et al. | |

FOREIGN PATENT DOCUMENTS

| | | |
|---|---|---|
| FR | 2795714 | 1/2001 |
| FR | 2881421 | 8/2006 |
| JP | 360145918 A | 8/1985 |
| JP | 362246830 A | 10/1987 |
| WO | WO 03/066449 | 8/2003 |

OTHER PUBLICATIONS

"Whats New in Glass Might Surprise You" Food and Drug Packaging, Oct. 2006 p. 68-70.
Translation of Saudi Office Action AppNo. 08290605 Filing Date: 22/09/1429H Type of App: Patent Applicant: Owens-Brockway Glass Container Inc. Agent: Nassir Ali Kadasa.

* cited by examiner

*Primary Examiner* — Matthew Daniels
*Assistant Examiner* — Cynthia Szewczyk

(57) ABSTRACT

A narrow neck glass container includes a container body and a container neck finish. The container neck finish has an external closure attachment diameter of not more than 36 mm, and the container body has at least one internal embossment of predetermined geometry. The at least one internal embossment preferably comprises a plurality of internal embossments in a geometric pattern.

4 Claims, 5 Drawing Sheets

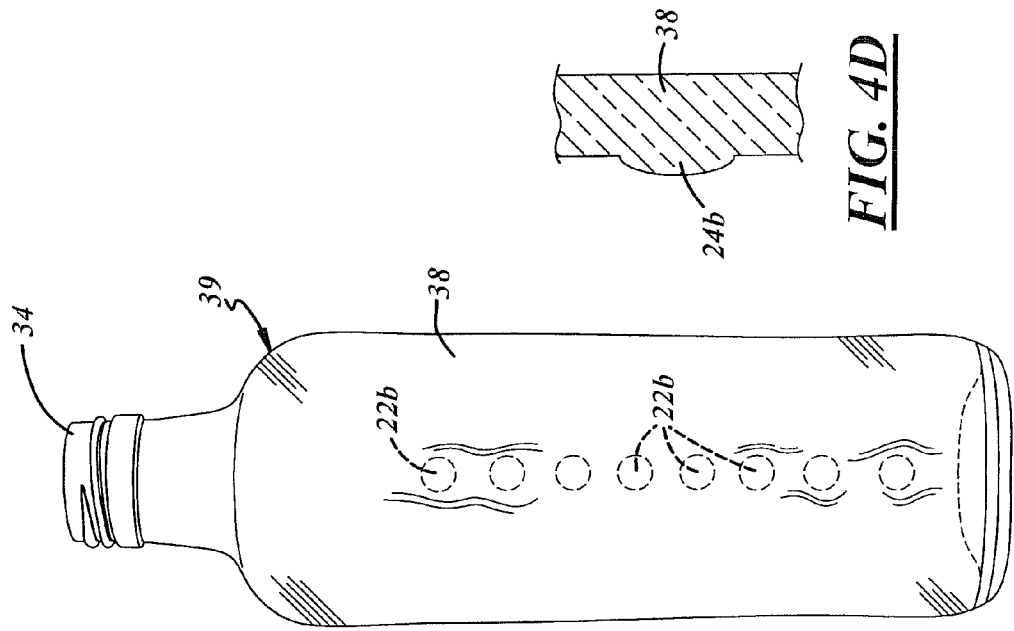
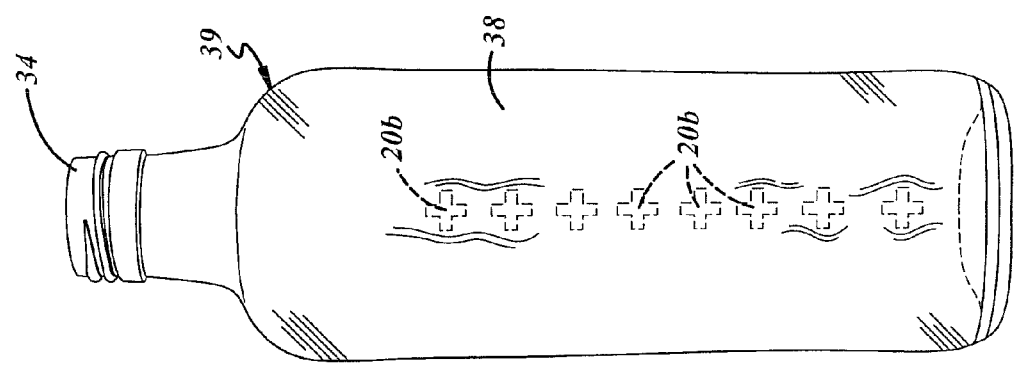
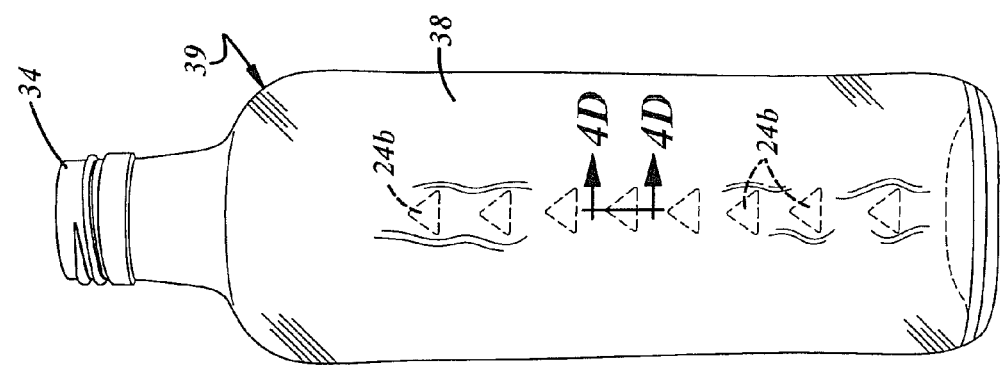
FIG. 4A  FIG. 4B  FIG. 4C  FIG. 4D

NARROW NECK GLASS CONTAINER WITH INTEGRAL EMBOSSMENTS AND METHOD OF MANUFACTURE

This application is a division of application Ser. No. 11/904,437 filed Sep. 27, 2007.

The present disclosure relates to manufacture of a narrow neck press-and-blow glass container having at least one embossment on an internal surface of the container.

BACKGROUND AND SUMMARY OF THE DISCLOSURE

Narrow neck glass containers, such as beverage containers, conventionally are fabricated in a press-and-blow or a blow-and-blow manufacturing operation. In a press-and-blow operation, a molten glass charge or gob is placed in a blank mold and a plunger is moved into the blank mold to form the molten glass gob against the inside surfaces of the blank mold. The glass preform or parison then is removed from the blank mold and placed in a blow mold, in which the parison body is stretched by blow gas (usually air) against the internal surfaces of the blow mold while the neck finish remains in the geometry formed in the blank mold. It is desirable to provide internal embossments on the body of the final glass container for decorative or other purposes. It has been proposed to provide external debossments or pockets on a press-and-blow plunger to form internal embossments in a glass parison, which become internal embossments in the final glass container body after blow molding. However, this technique is not feasible in a narrow neck press-and-blow manufacturing operation because the outer surface of the plunger is essentially parallel to the direction of plunger motion. It therefore is one general object of the present disclosure to provide a method of making a narrow neck glass container in a press-and-blow manufacturing process and having at least one internal embossment on the glass container body.

The present disclosure embodies a number of aspects that can be implemented separately from or in combination with each other.

A method of making a narrow neck glass container having a container neck finish and a container body with at least one internal embossment, in accordance with one aspect of the present disclosure, includes providing a blank mold having a mold body and a neck ring. The neck ring has an internal surface for forming the final container neck finish having an external closure attachment diameter (i.e., a T (thread) diameter of a threaded finish and an A diameter of a crown finish) of not more than 36 mm. The blank mold body has an internal surface with at least one debossment or pocket of predetermined geometry. A gob of molten glass is placed in the blank mold, and a plunger is moved through the neck ring into the mold body to form the molten glass against the internal surfaces of the neck ring and the mold body. A glass parison thereby is formed having the final container neck finish and a parison body with at least one external embossment corresponding to the at least one internal debossment on the mold body internal surface. The glass parison preferably is removed from the blank mold and placed into a blow mold having an internal surface. Blow gas is directed through the neck finish into the parison body to stretch the parison body against the blow mold internal surface and thereby push the at least one external embossment through the wall of the parison body and form a container body having at least one internal embossment corresponding to the external embossment on the parison.

In accordance with another aspect of the present disclosure, a narrow neck glass container includes a container body and a container neck finish. The container neck finish has a T diameter of not more than 36 mm, and the container body has at least one internal embossment of predetermined geometry. The at least one internal embossment preferably comprises a plurality of internal embossments in a geometric pattern. A glass parison in accordance with a further aspect of the present disclosure includes a parison body and a neck finish. The neck finish has an external closure attachment diameter of not more than 36 mm, and the parison body has at least one external embossment of predetermined geometry. The at least one external embossment preferably comprises a plurality of external embossments in a geometric pattern.

BRIEF DESCRIPTION OF THE DRAWINGS

The disclosure, together with additional objects, features, advantages and aspects thereof, will best be understood from the following description, the appended claims and the accompanying drawings, in which:

FIGS. 4A-4C are side elevational views taken from different directions of the container blow molded in FIGS. 3A-3B;

FIG. 4D is a fragmentary sectional view taken substantially along the line 4D-4D in FIG. 4A.

DETAILED DESCRIPTION OF PREFERRED EMBODIMENTS

Figure 1:
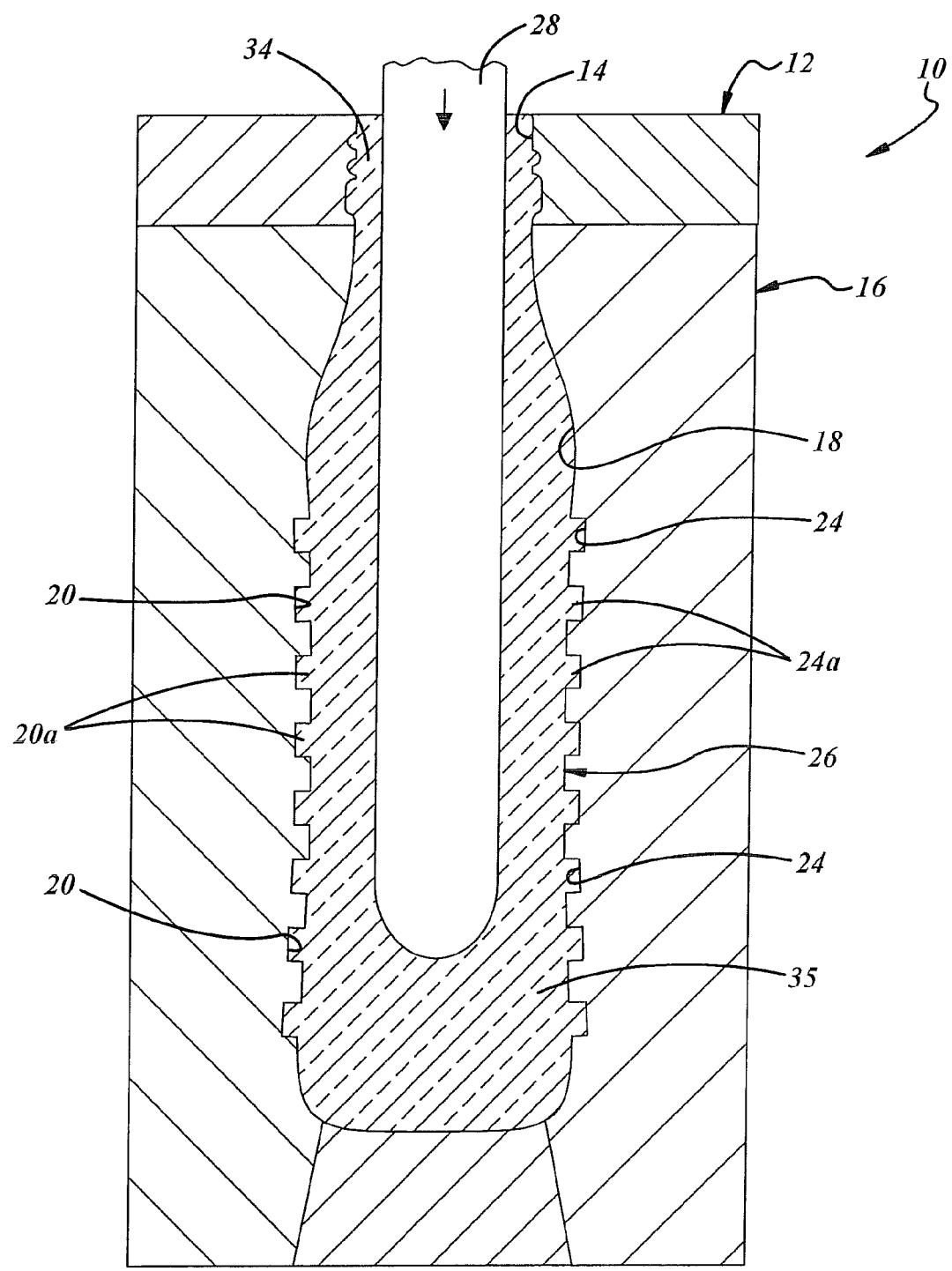
FIG. 1 is a cross-sectional schematic diagram of a blank mold in accordance with an exemplary embodiment of the present disclosure.
Figure 2:
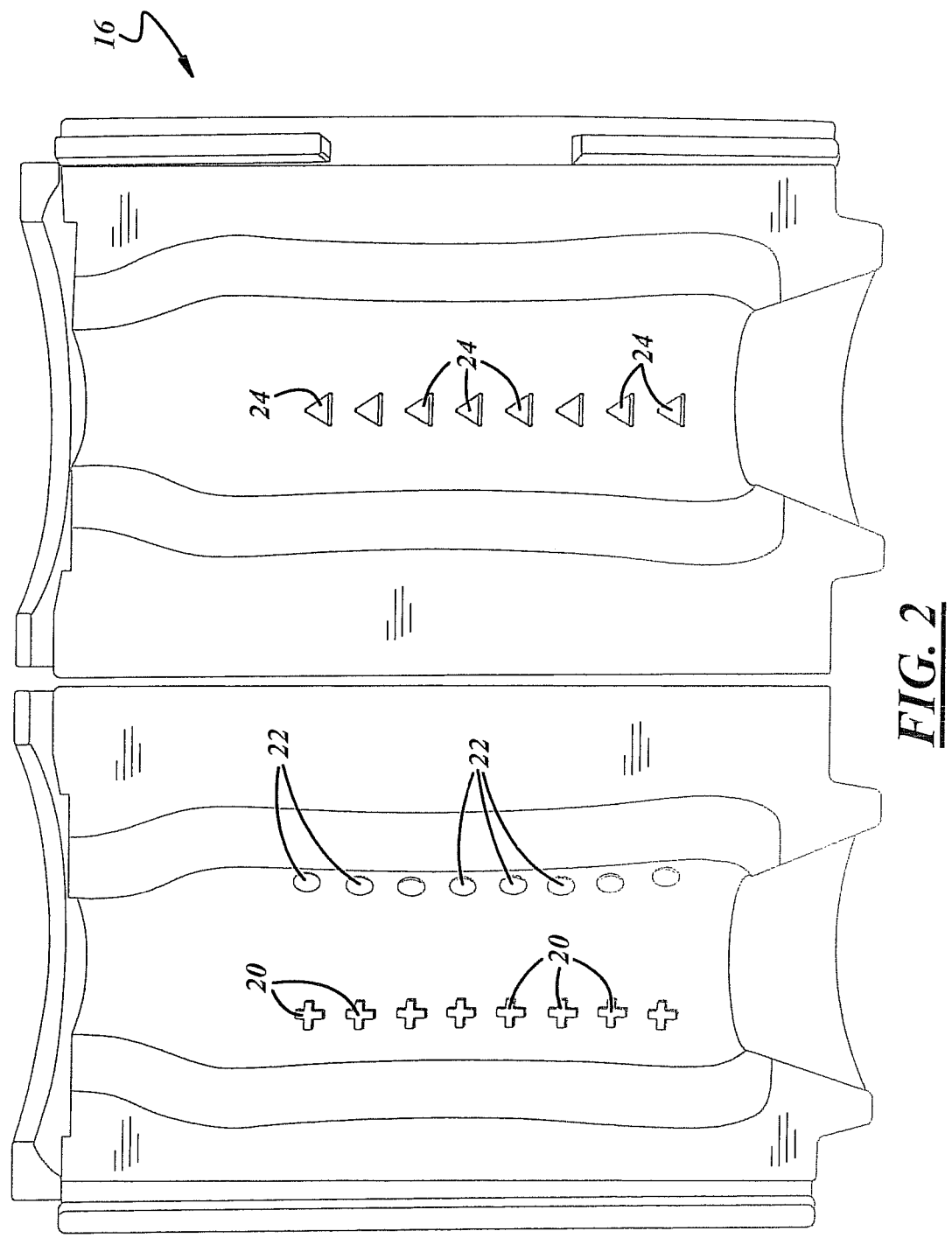
FIG. 2 is an elevational view of the blank mold in FIG. 1 exploded side-to-side for purposes of illustration.

FIGS. 1 and 2 illustrate the blank mold stage of a glass container manufacturing operation in accordance with an exemplary embodiment of the present disclosure. A blank mold 10 includes a multi-section neck ring 12 having an internal surface 14 for forming the final container neck finish geometry at the blank mold stage of manufacture. A multi-section blank mold body 16 has an internal surface 18 with at least one internal pocket or debossment, and preferably a plurality of internal pockets or debossments of predetermined geometry and preferably in a predetermined geometric pattern. For example, FIG. 2 illustrates internal debossments 20 of cross-shaped geometry, internal debossments 22 of part-spherical geometry and internal debossments 24 of triangular geometry. The respective series of debossments 20,22,24 are in linear arrays parallel to the axis of blank mold body 16. These particular exemplary debossment geometries and placements are for purposes of illustration only.

Figure 3B:
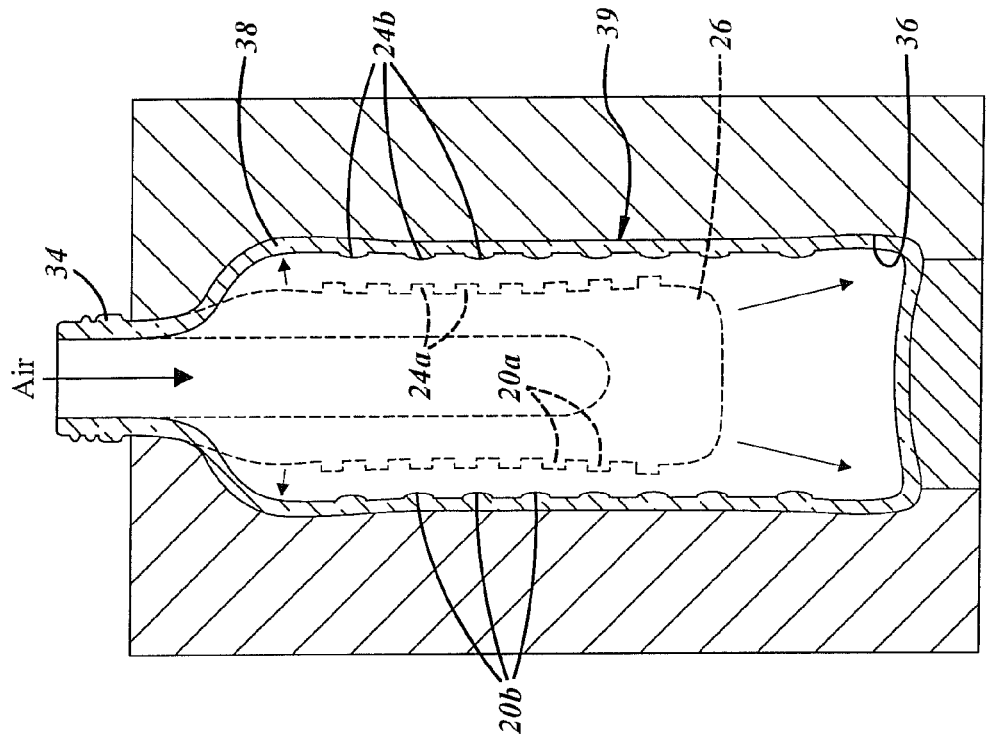
FIGS. 3A-3B are schematic sectional views that illustrate blow molding of the glass parison formed in FIG. 1.
Figure 3A:
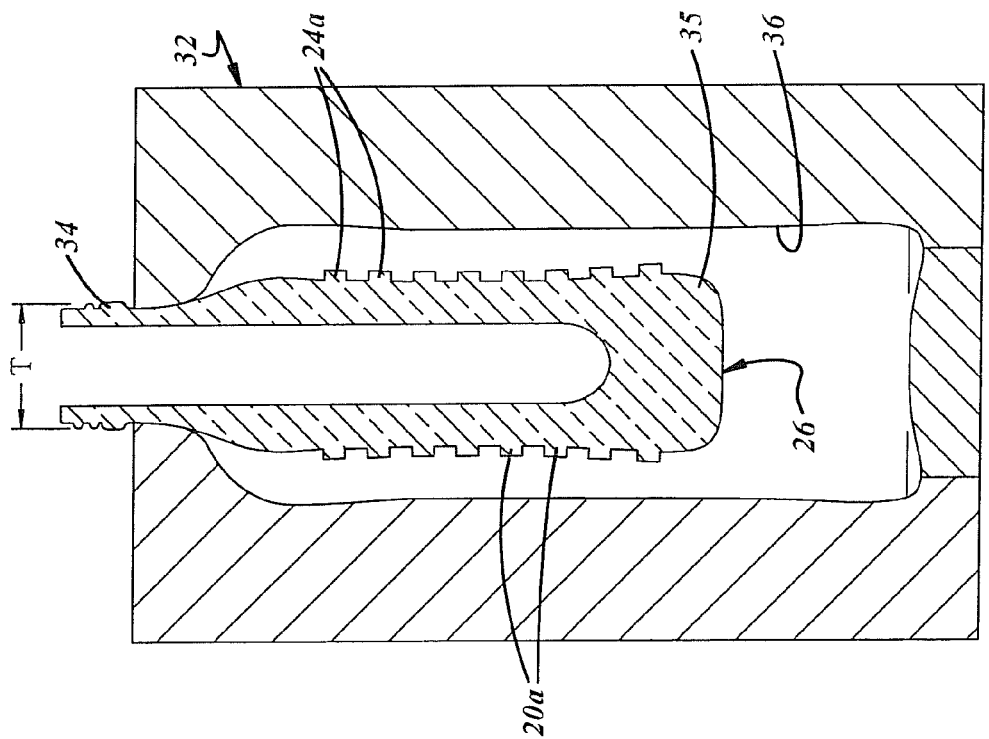

To fabricate a container preform or parison 26 (FIGS. 1 and 3A), a charge or gob of molten glass is placed within the internal cavity of blank mold 16, and a plunger 28 is propelled through neck ring 12 into the internal cavity of mold body 16. Plunger 28 forms the molten glass against internal surfaces 14,18 of blank mold 10, forming a neck finish 34 of final geometry and a parison body 35 having external embossments 20a, 24a (FIGS. 3A, and 22a not shown) corresponding in geometry and spacing to respective internal debossments 20, 24 (and 22) on mold body internal surface 18. Plunger 28 is withdrawn and parison 26 is moved to a multi-section blow mold 32 (FIGS. 3A and 3B). Narrow-neck finish 34 has a threaded finish in this example with a T diameter (FIG. 3A) of not more than 36 mm (All exemplary dimensions are nominal and are subject to variations due to manufacturing tolerances.)

Figure 5C:
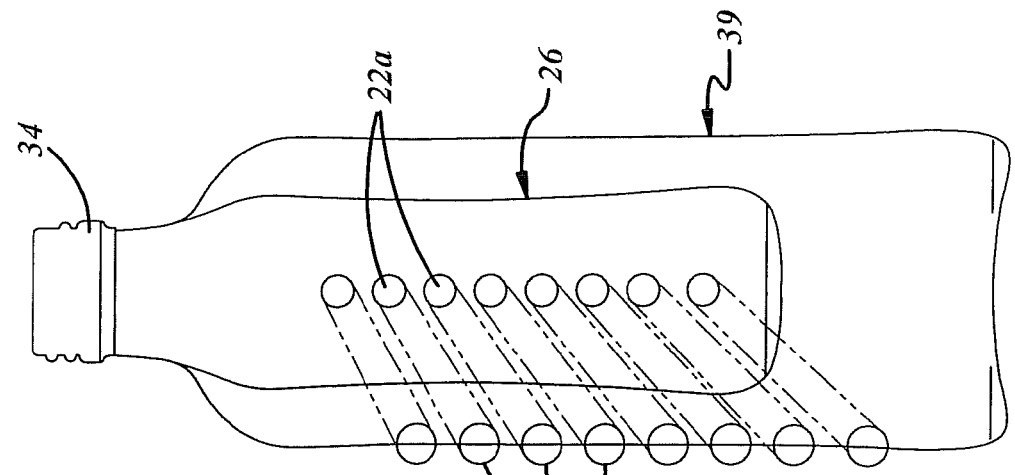
FIGS. 5A-5C are schematic diagrams that illustrate stretching of the glass container parison during the blow molding operation of FIG. 3B.
Figure 5B:
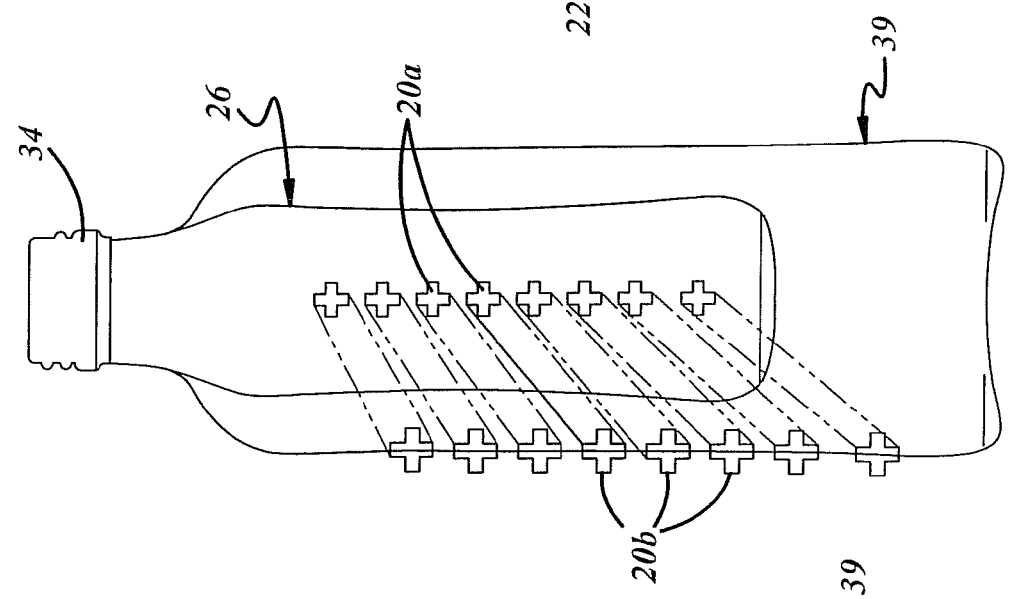
Figure 5A:
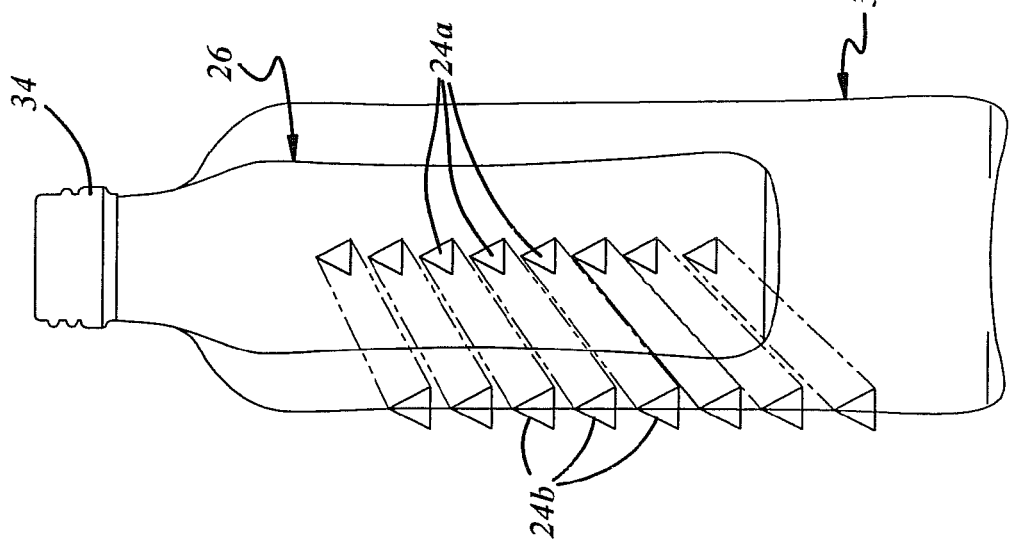

A blow gas, usually air, is directed through neck finish 34 of parison 26 into the hollow interior of the parison to stretch parison body 35 toward the internal surface 36 of blow mold 32 (FIG. 3B). (A vacuum can simultaneously be drawn around the parison outwardly against the blow mold surface.) As the parison expands and stretches, external parison embossments 20a, 24a (and 22a) simultaneously expand and stretch. When the external surface of the expanding parison body comes into contact with internal blow mold surface 36, the external embossments 20a, 24a (and 22a not shown) on the parison body are effectively pushed through the sidewall of the expanding parison to form internal embossments 20b, 22b, 24b (FIGS. 3A-4D) on the sidewall 38 of the blown container body 39. The geometries of the internal embossments typically are less sharp than those of the original external embossments due to the stretching and displacement through the container wall that takes place during blowing, as illustrated in FIG. 4D. The glass of the parison body normally is stretched more than 45% during this blowing operation, and typically is stretched in the range of 45% to 70%. Internal embossments 20b, 22b, 24b (FIGS. 4A-5C) have geometries and patterns corresponding to the geometries and patterns of internal debossments 20, 22, 24 (FIG. 2) in blank mold 16 as stretched and displaced during the blow molding operation. This stretching and displacement is illustrated in FIGS. 5A-5C.

There thus have been disclosed a method of making a narrow neck glass container parison and glass container, and a narrow neck glass container and a glass container parison made by such method, that fully satisfy all of the objects and aims previously set forth. The disclosure has been presented in conjunction with an exemplary embodiment, and various modifications and variations have been described. Other modifications and variations readily will suggest themselves to persons of ordinary skill in the art in view of the foregoing description. For example, although the exemplary embodiment of the disclosure places the internal embossments on the sidewall of the container body, internal embossments could be placed on the container base by providing debossments or pockets in the blank mold baffle in FIG. 1, and blowing the resulting parison base against the blow mold end plate illustrated in FIGS. 3A and 3B. The disclosure is intended to embrace all such modifications and variations as fall within the spirit and broad scope of the appended claims.

The invention claimed is:

1. A method of making a narrow neck glass container having a container neck finish and a container body with at least one internal embossment, which includes the steps of:
   (a) providing a blank mold that includes a mold body and a neck ring, said neck ring having an internal surface for forming a container neck finish having an external closure attachment diameter of not more than 36 mm, said mold body having an internal surface with at least one debossment of predetermined geometry,
   (b) placing a gob of molten glass in said blank mold,
   (c) moving a plunger through said neck ring into said mold body to form said molten glass gob against said internal surfaces of said neck ring and said mold body, and thereby form a glass parison having said container neck finish and a parison body with at least one external embossment corresponding to said internal debossment in said mold body internal surface,
   (d) removing said glass parison from said blank mold
   (e) placing said glass parison into a blow mold having an internal surface,
   (f) directing blow gas through said container neck finish into said parison body to expand and stretch said parison body, including said at least one external embossment, against said blow mold internal surface, and thereby push said at least one external embossment on said parison through said parison body and forming a container body having at least one internal embossment corresponding to said external embossment, and
   (g) removing the glass container from said blow mold, wherein said parison body with embossment stretches at least 45% during said step (f).

2. The method set forth in claim 1 wherein said parison body with embossment stretches in the range of 45% to 70% during said step (f).

3. The method set forth in claim 2 wherein said at least one internal debossment on said internal surface of said blank mold body includes a plurality of internal debossments in a geometric pattern, and wherein said at least one internal embossment formed in said step (f) comprises a plurality of internal embossments in a geometric pattern corresponding to said predetermined geometric pattern of said internal debossments.

4. A glass container made in accordance with the method set forth in claim 3.

* * * * *